United States Patent Office 3,781,315
Patented Dec. 25, 1973

3,781,315
HALO ALKOXY METAL COMPOUNDS
Anthony E. Pepe, Hacienda Heights, and Hakam Singh, Newhall, Calif., assignors to Products Research & Chemical Corporation, Burbank, Calif.
No Drawing. Filed July 9, 1971, Ser. No. 161,920
Int. Cl. C07f 7/22
U.S. Cl. 260—429.7                       10 Claims

ABSTRACT OF THE DISCLOSURE

Tin and titanium compounds containing, as the functional group, the radical

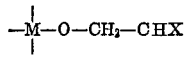

in which M is tin or titanium and X is chlorine or bromine, said compounds being useful as catalysts for curing polysiloxane, polyurethane, and epoxy polymers. There is also disclosed a method for making such organometallic compounds which includes the step of reacting tin or titanium compounds having from 1 to 4 chlorine or bromine atoms with epoxy organic compounds.

BACKGROUND OF THE INVENTION

Organo-metallic compounds have been utilized by prior art workers as catalysts in various polymer formulations. Some of the best known types of catalysts are metallic soaps. Metallic soaps have commonly been used as catalysts in polysiloxane and polyurethane polymerizations. When used on functionally terminated liquid polysiloxane condensations (or graft copolymers having such a termination) the catalysts are somewhat effective at low concentrations but when utilized at higher concentrations the resulting polymers have an undesirable early viscosity buildup. The catalysts of the present invention do not have this disadvantage. For example, polysiloxanes prepared with catalysts of this invention have a higher physical strength than those prepared with the metallic soaps and, in addition, are less sensitive to atmospheric moisture variations thereby having more uniform cures.

In addition to the metallic soaps, certain tin compounds have been utilized as catalysts in polysiloxane formulations, see, for example, U.S. Pat. 3,470,221. However, these compounds are very difficult to prepare and the polymers resulting from such compositions have a great many disadvantages. For example, such compounds give off hydrochloric acid which, of course, is very undesirable.

SUMMARY OF THE INVENTION

From the foregoing it is apparent that it is a desideratum in the art to have a catalyst which will simply, economically and easily catalyse the polymerization (curing) of silicones, urethanes and epoxies. Moreover, such catalysts should be easily and economically prepared from readily available materials with no substantial production of any by-products.

It is therefor the primary object of the present invention to provide and disclose, halo alkoxy tin and titanium (hereinafter abbreviated as M) catalysts having, as the functional unit, the radical:

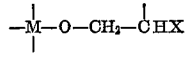

Another object of the present invention is to disclose and embody a method for preparing stannic and titanic ether catalysts cheaply and efficiently with no production of by-products.

A further object of the present invention is to disclose and provide a method for polymerizing silicones, urethanes and epoxies utilizing a stannic and titanic ether catalysts having at least one chlorine or bromine atom.

Another and further object of the present invention is to disclose and embody novel tin an titanium catalysts containing two or more (e.g. 5) radicals of the following formula:

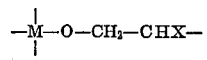

Other objects of the present invention will be apparent from the following description of the preferred exemplary embodiments wherein all percentages and parts are by weight unless otherwise expressly stated.

Generally stated, the foregoing objects of the present invention are accomplished by providing organic components having one or more units corresponding to the formula

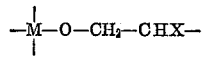

Preferably the compounds of the invention correspond to the following formula:

(I)

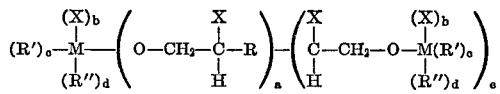

wherein M is tin or titanium; R is an organic radical; each of R' and R" is a hydrocarbon of from 1 to 18 carbon atoms and/or an oxo-hydrocarbon of from 1 to 10 carbon atoms; X is a halogen atom which can be either chlorine or bromine; $e$ is an integer of from 0 to 2, and when $e$ is 1 or 2, $a$ is 1, the sum of $b+c+d$ is 3 and each of $b$, $c$, and $d$ is an integer of from 0 to 3; and when $e$ is 0, $a$ is an integer of from 1 to 4, the sum of $b+c+d$ is $4-a$, and each $b$, $c$, and $d$ is an integer of from 0 to 3.

The preferred compounds coming within the above description are compounds having the following structural formula:

(II)

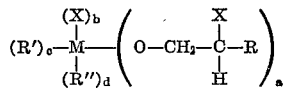

wherein M is tin or titanium and R is any organic radical but is preferably hydrocarbon which may contain oxygen and/or halogen. R' and R" are each a hydrocarbon group of from 1 to 18 carbon atoms or oxygen substituted hydrocarbon group having 1 to 10 carbon atoms. Exemplary groups are aliphatic, e.g. alkyl of from 1 to 6 carbon atoms; aryl, aralkyl, and aliphatic ethers. X is chlorine or bromine, $a$ is a positive integer of from 1 to 4, the sum of $b+c+d$ is $4-a$, and each of $b$, $c$, and $d$ is an integer of from 0 to 3.

Compounds of the above formula can be made by the following reaction:

(III)

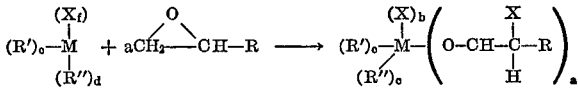

wherein M, R, R' R", X, a, b, c, d have the same meanings as given before and $f$ is an integer of from 1 to 4, the sum of $f+c+d$ being 4.

Tin compounds utilized as reactants are aliphatic (e.g. alkyl) tin compounds containing from 1 to 6 carbon atoms such as dibutyltin dibromide, dibutyltin dichloride, diethylisoamyltin chloride, diethylisobutyltin bromide, diethyl-m-propyltin bromide, diethyl-m-propyltin chloride, diethyltin dibromide and dichoride, and diisobutyltin dichloride; aromatic tin compounds such as dibenzyltin dibromide and dichloride, dichlorodi-m-toly stanane, diphenyltin dibromide and dichloride, di-o-tolyltin dichloride, triphenyltin bromide and chloride, and tri-p-xylyltin bromide and chloride; and tin substituted only with bromine or chlorine such as stannic bromide and stannic chloride.

The corresponding titanium compounds have also been utilized to good effect.

Epoxy compounds which can be utilized as reactants are any organic compounds having one or more functional epoxy group. Hydrocarbon epoxies containing halogen (e.g. chlorine) and/or oxygen yield desired results. Compounds which may be mentioned and which have been found to be satisfactory are aliphatic epoxies containing, e.g, from 3 to 10 carbon atoms, such as propylene oxide; cycloaliphatic epoxies such as cyclohexene epoxide; aliphatic ethers such as butyl glycidyl ether; halogenated aliphatic such as epichlorhydrin; and aromatics such as phenyl glycidyl ether.

Epoxy compounds having two or more epoxy groups which are useful are the liquid adducts of epichlorohydrin-bisphenol A, such as those compounds known as Epons. If such epoxy compounds are utilized and equal equivalents of the epoxy and halide are employed the final product will be a polymer containing functional units of the formula

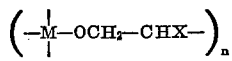

e.g. 3 to 5 or higher.

The amount of the individual reactant depends upon the amount of halogen atoms in the starting halide compound and the type of final product desired. For example, if the starting halide compound had 4 halogen atoms and the final product desired were 3 alkoxy-halide radicals attached to the tin or titanium then one would use 3 equivalents of the epoxy compound for each mole of halide. On the other hand, if one desired just one alkoxy-halide radical then the reactants could be on a mole for mole basis. It is preferable, however, if the epoxy equivalent is the same as or less than bromine or chlorine equivalent.

Generally, the reaction proceeds under ambient conditions and nothing more is necessary, if one of the reactants is a liquid, to disperse or dissolve the other reactant therein. The reaction is speeded up if the reactants are slightly heated say, for example, between 50° C., and 300° C. If neither of the reactants is liquid then it is desirable to melt one of the reactants prior to mixing the other reactant therewith. For example, if dibutyl tin dichloride is utilized and the other reactant is not a liquid then it is preferable if the dibutyltin dichloride is heated to above its melting point, e.g. 50° C.

In using the above catalysts for polysiloxane condensation, any of the variations of polymer and cross-linking agents known to respond to metallic soap catalysts will also respond to the present catalysts. Thus, disilanol-terminated polysiloxane, as well as alkoxy end-blocked, acetoxy terminals, can be utilized to good effect with the instant catalysts. Furthermore, when other backbones are terminated with silane functionalities, the instant catalysts are very useful.

The cross-linking agents commonly used to co-condense with terminally reactive siloxanes are di and tri substitutes mono silanes, condensation polymers thereof, and di or poly substituted organic silanes. These substituted materials include alkoxy ester silanols, hydrides, acetoxies and oximes. Additionally, the mono and polymeric forms of silicic acid esters are useful. All of these cross-linking agents are effective with the catalysts of this invention.

Additionally, the catalysts of the present invention are useful in curing or polymerizing urethane and also show excellent activity and compatibility in the reaction of epoxy resins with organic acids and anhydrides.

The amount of catalyst added to cure silicone, urethane, and epoxy compositions is not critical but, in general, it can be stated that, based on the total amount of the catalyst and the silicone, urethane, or epoxy to be cured, the percentage of catalyst should be about 0.05% (perferably 0.1%) to 1.0%. The catalyst of the present invention will effect cures in 15 minutes under ambient conditions and therefore no additional heat, moisture, etc. need be added. The only thing that is important is that the catalyst be uniformly dispersed throughout the composition to be cured.

Below there is given certain specific embodiments of the present invention which are for the purpose of illustration only and are not to be considered to be limiting.

EXAMPLE I

Dibutyl tin dichloride (304 parts) was stirred into butyl glycidyl ether (1 30parts) on a mole to mole basis. The reaction was endothermic. The product was warmed for 16 hours at 180° F. in order to insure completion of the reaction. Analysis for hydrolyzable chloride 8.17%, theory: 8.16%. The resulting compound had the formula

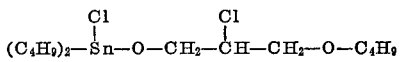

EXAMPLE II

One mole of dibutyl tin dichloride (304 parts) was mixed with two moles of butyl glycidyl ether (260 parts). Again the reaction was endothermic. The mixture was kept overnight at 158° F. to insure complete reaction. There are obtained a compound of the formula

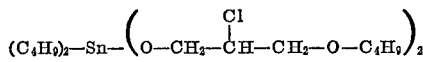

EXAMPLE III

Dibutyl tin dichloride (304 parts) was mixed with phenyl glycidyl ether (150 parts) by warming the dibutyl tin dichloride above its melting point and mixing with the warm ether. The resulting product was a waxy solid.

EXAMPLE IV

One mole of dibromo tin dilaurate was mixed with one mole of epichlorhydrin. The reaction product was a very fluid liquid.

EXAMPLE V

Tributyl tin monochloride (325 parts) was mixed with butyl glycidyl ether (260 parts), and warmed overnight at 180° F. The infrared scan showed disappearance of the epoxy group.

EXAMPLE VI

The following two formulations were prepared:

|  | A | B |
|---|---|---|
| 2,000 cps. dimethyl siloxane polymer, hydroxyl end blocked | 100 | 100 |
| Iron oxide | 76 | 76 |
| Ethyl silicate-40 | 5 | 5 |
| Dibutyl tin dilaurate |  | 4 |
| Catalyst of Example I | 0.3 |  |
| Properties: |  |  |
| Rex hardness | 55 | 55 |
| Tensile strength (p.s.i.) | 880 | 830 |
| Elongation (5) | 160 | 165 |
| Tear strength, die B (p.l.i.) | 60 | 20 |

EXAMPLE VII

|  | Parts by weight |
|---|---|
| 2000 molecular weight polypropylene glycol-diol terminated with toluene diisocyanate, 2,4 | 235 |
| 700 M.W. polypropylene glycol, triol | 25 |
| 1500 M.W. polypropylene glycol-diol | 75 |
| The catalyst of Example II | 0.5 |

The first three ingredients were blended and finally the catalyst stirred in. Within 15 minutes at room temperature, a tough, clean, bubble-free elastomer formed.

It will be understood that the foregoing description and examples are only illustrative of the present invention and it is not intended that the invention be limited thereto. Various modifications and alterations of the present invention may be made without departing from the spirit thereof and the scope of the appended claims.

We claim:

1. An organic catalyst having the formula

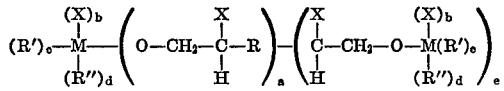

wherein M is a metal selected from the group consisting of tin and titanium; R is a member selected from the group consisting of hydrocarbon, oxo-hydrocarbon, and halogenated hydrocarbon; each of R' and R'' is selected from the group consisting of hydrocarbon of from 1 to 18 carbon atoms and oxo-hydrocarbon of from 1 to 10 carbon atoms; X is a halogen selected from the group consisting of chlorine and bromine; $e$ is an integer of from 0 to 2, and when $e$ is 1 to 2, $a$ is 1, the sum of $b+c+d$ is 3 and each of $b$, $c$, and $d$ is an integer of from 0 to 3; and when $e$ is 0, $a$ is an integer of from 1 to 4, the sum of $b+c+d$ is $4-a$, and each of $b$, $c$ and $d$ is an integer of from 0 to 3.

2. An organic catalyst according to claim 1 wherein M is tin.

3. An organic catalyst according to claim 1 wherein $e$ is 0.

4. An organic catalyst according to claim 3 wherein M is tin.

5. An organic catalyst according to claim 2 wherein X is chlorine.

6. An organic catalyst according to claim 4 wherein X is chlorine.

7. An organic catalyst according to claim 1 wherein R is a hydrocarbon having from 1 to 8 carbon atoms and is selected from the group consisting of aliphatic, cycloaliphatic, and aromatic.

8. An organic catalyst according to claim 7 wherein each of R' and R'' is selected from the group consisting of aliphatic of from 1 to 6 carbon atoms, benzyl, tolyl, and xylyl.

9. A method of preparing a catalyst of the formula

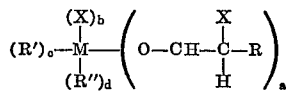

wherein X is halogen selected from theh group consisting of chlorine and bromine; M is a metal selected form the group consisting of tin and titanium; R is a member selected from hydrocarbon, oxo-hydrocarbon, and halogenated hydrocarbon; each of R' and R'' is a member selected from the group consisting of aliphatic of from 1 to 6 carbon atoms, benzyl, tolyl, and xylyl; $a$ is an integer of from 1 to 4; each of $b$, $c$, and $d$ is an integer of from 0 to 3; and the sum of $b+c+d$ is $4-a$; which comprises admixing a compound of the formula

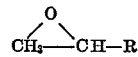

wherein R has the same significance as set forth above; with a compound of the formula

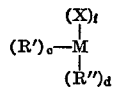

wherein $f$ is an integer of from 1 to 4 and $c$ and $d$ have the same significance as set forth above.

10. A method according to claim 9 wherein M is tin.

References Cited
UNITED STATES PATENTS

| | | | |
|---|---|---|---|
| 3,242,201 | 3/1966 | Cramer et al. | 260—429.7 |
| 3,424,772 | 1/1969 | Moshier | 260—429.5 |

WERTEN F. W. BELLAMY, Primary Examiner

U.S. Cl. X.R.
260—429.5